(12) United States Patent
Kempf et al.

(10) Patent No.: US 10,772,392 B2
(45) Date of Patent: Sep. 15, 2020

(54) FASTENING ELEMENT AND SYSTEM WITH A FASTENING ELEMENT

(71) Applicant: NEWFREY LLC, New Britain, CT (US)

(72) Inventors: Christian Kempf, Giessen (DE); Frank Rosemann, Giessen (DE)

(73) Assignee: NEWFREY LLC, New Britain, CT (US)

(*) Notice: Subject to any disclaimer, the term of this patent is extended or adjusted under 35 U.S.C. 154(b) by 344 days.

(21) Appl. No.: 15/869,354

(22) Filed: Jan. 12, 2018

(65) Prior Publication Data
US 2018/0199676 A1    Jul. 19, 2018

(30) Foreign Application Priority Data
Jan. 13, 2017    (EP) ..................................... 17151524

(51) Int. Cl.
| | |
|---|---|
| F16B 21/18 | (2006.01) |
| A44B 17/00 | (2006.01) |
| F16B 5/10 | (2006.01) |
| F16B 21/07 | (2006.01) |

(52) U.S. Cl.
CPC ............ *A44B 17/0011* (2013.01); *F16B 5/10* (2013.01); *F16B 21/073* (2013.01); *F16B 21/186* (2013.01)

(58) Field of Classification Search
CPC ... F16B 21/073; F16B 21/075; A44B 17/0047
USPC ........ 411/526, 521, 525, 928, 918; 403/280; 70/57.1
See application file for complete search history.

(56) References Cited

U.S. PATENT DOCUMENTS

| | | | | |
|---|---|---|---|---|
| 1,407,779 | A * | 2/1922 | Yocum | F16B 39/32 411/199 |
| 2,950,132 | A * | 8/1960 | Kocsuta | F16L 37/0885 285/307 |
| 3,796,124 | A * | 3/1974 | Crosa | E04D 3/3605 411/521 |
| 3,876,821 | A * | 4/1975 | Pringle | H02G 3/081 174/53 |
| 4,635,966 | A * | 1/1987 | Hermann | F16L 33/03 285/3 |
| 8,033,578 | B2 * | 10/2011 | De Wilde | F16L 37/091 285/340 |

(Continued)

FOREIGN PATENT DOCUMENTS

DE    4022145 A    1/1992

OTHER PUBLICATIONS

European Search Report dated May 25, 2018.

*Primary Examiner* — Gary W Estremsky
(74) *Attorney, Agent, or Firm* — Michael P. Leary; Kofi A. Schulterbrandt (57) ABSTRACT

A fastening element comprises a housing having a top side and a bottom side and partially defines a recess extending along a longitudinal axis and adapted to receive the shaft of a stud, and a slit extending radially from the recess. The fastening element further comprising a spring ring seated in the slit and protruding radially into the recess. The sprig ring is seated rotatable in the slit, so that a rotational motion of the spring ring within the housing is allowed. The spring ring comprises a body and spring fingers, wherein the body is an annular body partially defining a hole, and wherein the spring fingers protrude radially into the hole.

29 Claims, 5 Drawing Sheets

(56) References Cited

U.S. PATENT DOCUMENTS

| | | | | |
|---|---|---|---|---|
| 9,541,228 B2* | 1/2017 | Bobo | .................. | F16L 37/0915 |
| 9,777,875 B2* | 10/2017 | Bobo | .................... | F16L 37/091 |
| 2005/0008456 A1 | 1/2005 | Birkelbach et al. | | |
| 2012/0052710 A1 | 3/2012 | Deehr et al. | | |

* cited by examiner

FASTENING ELEMENT AND SYSTEM WITH A FASTENING ELEMENT

CROSS-REFERENCE TO RELATED APPLICATION

This application claims priority from European Patent Application No. 17151524.0, filed on Jan. 13, 2017, the disclosure of which is incorporated herein by reference.

BACKGROUND OF THE INVENTION

The present invention relates to a fastening element having:
- a housing, said housing comprising a first recess extending along a longitudinal axis and adapted to receive the shaft of a stud, and a slit extending radially from the recess, and
- a spring ring seated in the slit, wherein the spring ring partially protrudes into the recess.

The present invention is also directed to a system with a first component provided with a stud and a second component provided with a fastening element, wherein the stud is received within the recess.

It is known from the state of the art to provide fastening elements with a recess, in which a stud (or more precisely the shaft of a stud, or a bolt) is inserted, such fastening elements being able to retain the stud. In the automobile industry, for example, such elements are used either to assemble together two components of a vehicle, such as, but not limited to, vehicle panels, flaps, engine flaps, actuators, drive elements, hinged elements.

SUMMARY OF THE INVENTION

One objective of the present invention is to provide a fastening element easy to manufacture and to mount, with low mounting forces and high holding forces. It is also an object of the invention to provide a fastening element allowing a "soft" attachment able to absorb shocks received by the system, in order to improve the stability and the service life of such systems.

To this aim, according to the invention, it is provided a fastening element having:
- a housing, said housing comprising a first recess extending along a longitudinal axis and adapted to receive the shaft of a stud, and a slit extending radially from the recess, and
- a spring ring seated in the slit, wherein the spring ring partially protrudes into the recess, Wherein the spring ring is seated rotatable in the slit, so that a rotational motion of the spring ring within the housing is allowed.

The arrangement of the spring ring within the housing allows to decrease the risks of damage of the fastening element and therefore increase the service life of the fastening element.

According to an aspect, the housing is made of plastic material. The housing is thus easy to manufacture.

According to an aspect, the housing is made of polyamide (PA) or polyoxymethylene (POM) or any rigid plastic material.

According to an aspect, the spring ring comprises a body and spring fingers.

According to an aspect, the body is an annular body defining a hole.

According to an aspect, the spring fingers protrude into the hole.

According to an aspect, the spring fingers are equally spaced around the longitudinal axis.

According to an aspect, the body extends in a body plane that extends substantially perpendicular to the longitudinal axis.

According to an aspect, the spring fingers each extends substantially in a finger plane.

According to an aspect, the body plane and the finger plane are at an angle between 0 and 90 degrees, in particular between 0 and 45 degrees, or between 0 and 30 degrees, or between 5 and 30 degrees or between 5 and 25 degrees or between 5 and 20 degrees, or of 15 degrees.

According to an aspect, the housing has a circular section and is centered around the longitudinal axis.

According to an aspect, the housing has a diameter being between 10 and 30 millimeters.

According to an aspect, the housing comprises a top side, a bottom side and a lateral wall.

According to an aspect, the top side extends in a top side plane that extends substantially perpendicular to the longitudinal axis.

According to an aspect, the bottom side extends in a bottom side plane that extends substantially perpendicular to the longitudinal axis.

According to an aspect, the distance along the longitudinal axis between the top side and the bottom side is between 5 and 20 millimeters, in particular between 4 and 12 millimeters, or between 5 and 10 millimeters.

According to an aspect, wherein the housing is provided with strips having a first and a second end along a strip axis.

According to an aspect, the first end is connected to the bottom side.

According to an aspect, the second end is a free end.

According to an aspect, the second end is directed toward the longitudinal axis.

According to an aspect, the angle between the strip axis and between the longitudinal axis is between 0 and 90 degrees, in particular between 10 and 45 degrees.

According to an aspect, the spring fingers are oriented toward the longitudinal axis and toward the top side. The orientation of the spring fingers allows good securing forces with low mounting forces.

According to an aspect, the slit partly opens through the lateral wall.

According to an aspect, the bottom side is provided with a collar that partly extends around the recess.

According to an aspect, the top side comprises notches equally installed around the longitudinal axis. The notches allow to reduce the weight of the fastening element without decreasing it mechanical properties.

According to an aspect, the spring ring is made of metal.

According to an aspect, the spring ring is seated in the slit with a certain degree of clearance along the longitudinal axis. It improves the "soft" assembly.

According to an aspect, the recess is a blind hole.

According to an aspect, the recess is a through hole.

According to an aspect, the fastening element may have convex outside surfaces. The convex surfaces can form a good support surface for the stud or a flange of the stud.

Another object of the present invention is a system with:
- a first component provided with a stud,
- a second component provided with the fastening element described above, Wherein the stud is received within the recess, and wherein the stud cooperates with the spring ring and retains the stud within the recess.

Due to the fact that the spring ring is pivotally fitted within the housing, the fastening element should not cause any damage to the outer surface of the stud, which avoid any problem of corrosion.

The system allows an excellent vibration and noise damping, notably through the arrangement of the spring ring, but also through the spring fingers and the strips.

The stud mounting forces within the hole and through the spring fingers are low, whereas the demounting forces stay high, in order to avoid any unintended disassembly of first and second components.

During a crash, the fastening element guides the stud, in such way that a deformation of the stud in a radial direction is avoided.

More particularly, such system mounted within a vehicle, allows to avoid any unintended disassembly of first and second components in case of a crash.

According to an aspect, the stud extends along a stud axis with a free end.

According to an aspect, the free end cooperate with the recess.

According to an aspect, the stud is provided with an enlarged section toward the free end.

According to an aspect, the fastening element comprises spring fingers.

According to an aspect, the enlarged section of the stud is retained within the recess by the spring fingers According to an aspect, the enlarged section of the stud forms a supporting surface against which the spring ring rests and prevents an uncoupling of the first and second component.

According to an aspect, the enlarged section of the stud forms a supporting surface against which the spring fingers rest.

According to an aspect, the stud is an impress stud.

According to an aspect, the stud is a welding stud.

According to an aspect, a spring is provided between the first and the second components.

According to an aspect, the spring is distant from the fastening element.

According to an aspect, the first component is a drive element.

According to an aspect, the second component is a hinged element of a flap, in particular an engine flap, more precisely an engine flap for a vehicle According to an aspect, the first component is a hinged element of a flap, in particular an engine flap, more precisely an engine flap for a vehicle, and wherein the second component is a drive element.

BRIEF DESCRIPTION OF THE DRAWINGS

Other characteristics and advantages of the invention will readily appear from the following description of embodiments, provided as non-limitative examples, in reference to the accompanying drawings.

On the different Figures, the same reference signs designate identical or similar elements.

DETAILED DESCRIPTION OF THE PREFERRED EMBODIMENTS

Figure 9:
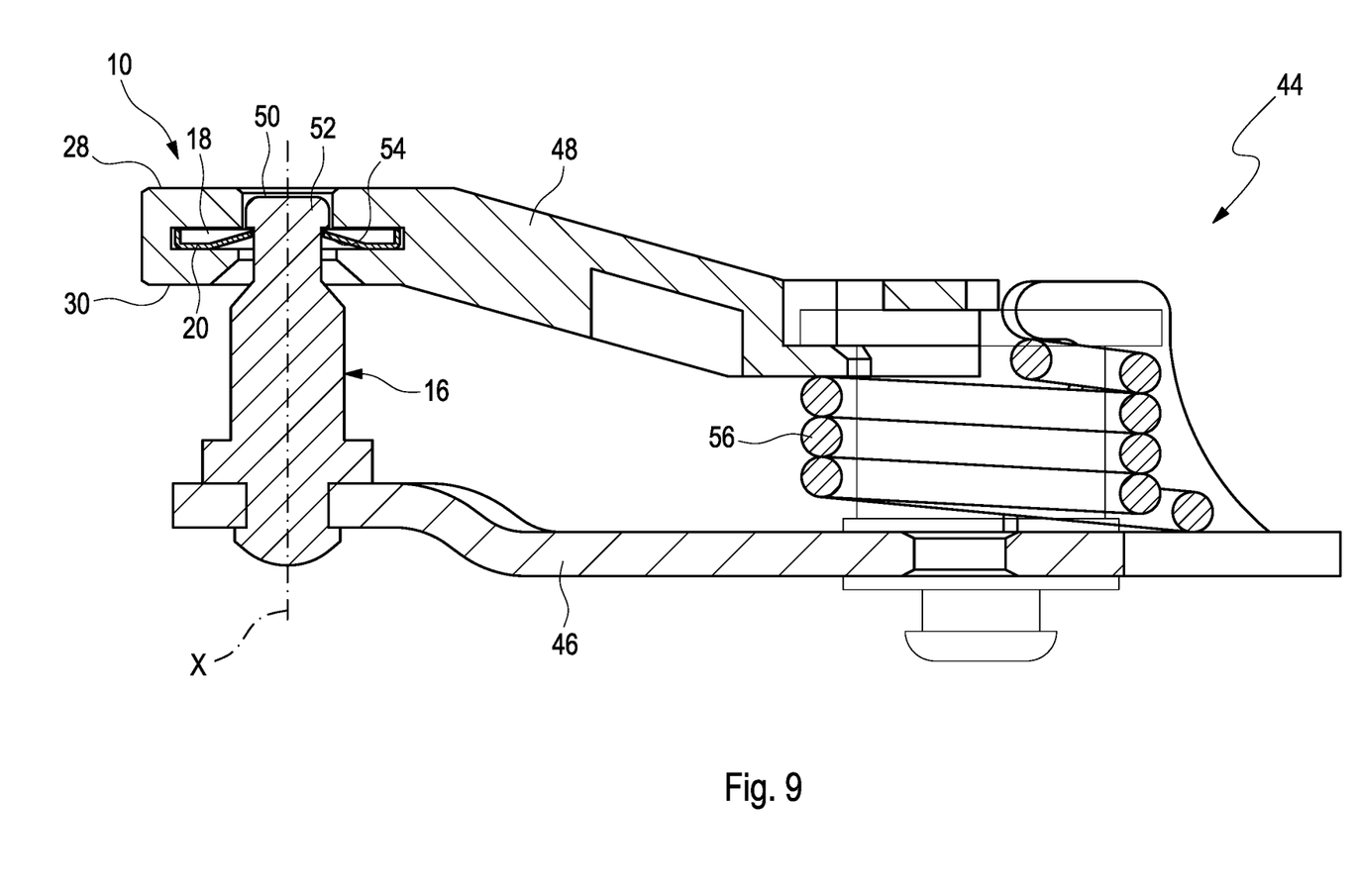
FIG. 9 is a schematic longitudinal sectional view of a system with the fastening element of FIG. 1.

FIG. 9 shows a system 44 with a first component 46, a second component 48 and a fastening element 10.

The fastening element 10 comprises a housing 12. The housing 12 has a recess 14 extending along a longitudinal axis X and adapted to receive the shaft of a stud 16. A slit 18 extends radially from the recess 14. The recess can be a through hole or a blind hole.

The housing comprises a top side 28, a bottom side 30 and a lateral wall 32. The slit 18 partly opens through the lateral wall.

The housing 12 has for example a circular cross-section and is centered on the longitudinal axis. The housing has a diameter being between 10 and 30 millimeters.

The top side 28 extends in a top side plane that extends substantially perpendicular to the longitudinal axis X. The bottom side 30 extends in a bottom side plane that extends substantially perpendicular to the longitudinal axis X. The distance along the longitudinal axis between the top side and the bottom side is between 5 and 20 millimeters, in particular between 4 and 12 millimeters, or between 5 and 10 millimeters.

The housing 12 is for example made of plastic material. Materials as PA or POM or any rigid plastic material can be implemented.

Figure 8:
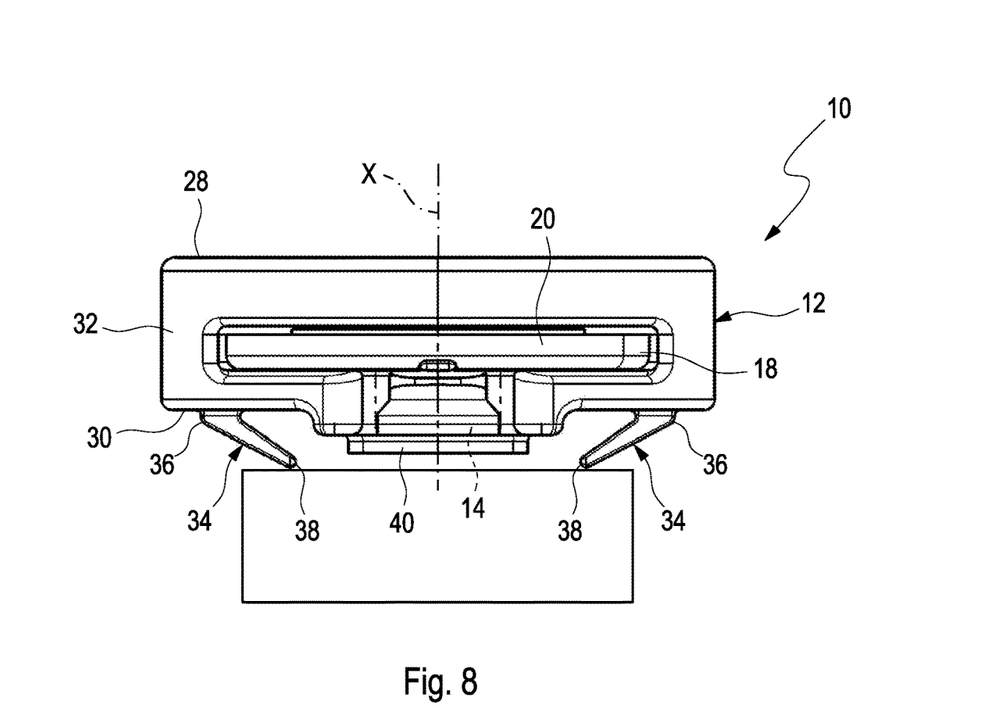
FIG. 8 is a side view of the fastening element of FIG. 1 with strips resting against a surface of another elements. The strips allow to absorb shocks.

As represented in FIG. 1, FIG. 2, FIG. 3, FIG. 4, FIG. 5 or FIG. 6, the housing is provided with strips 34 having a first and a second end 36, 38 along a strip axis. The strips 34 are adapted to rest against a surface as represented in FIG. 8. The first end 36 is connected to the bottom side. The second end is a free end. The second end is directed toward the longitudinal axis X. More particularly the second end projects radially inwardly. The angle between the strip axis and between the longitudinal axis X is between 0 and 90 degrees, in particular between 10 and 45 degrees.

Figure 1:
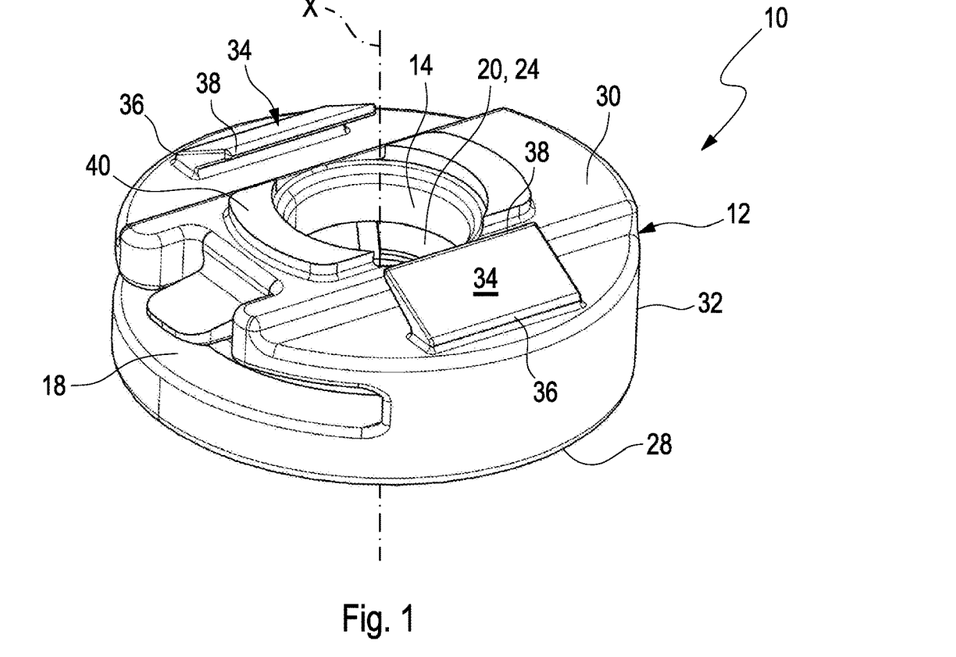
FIG. 1 is a perspective view of a fastening element.
Figure 2:
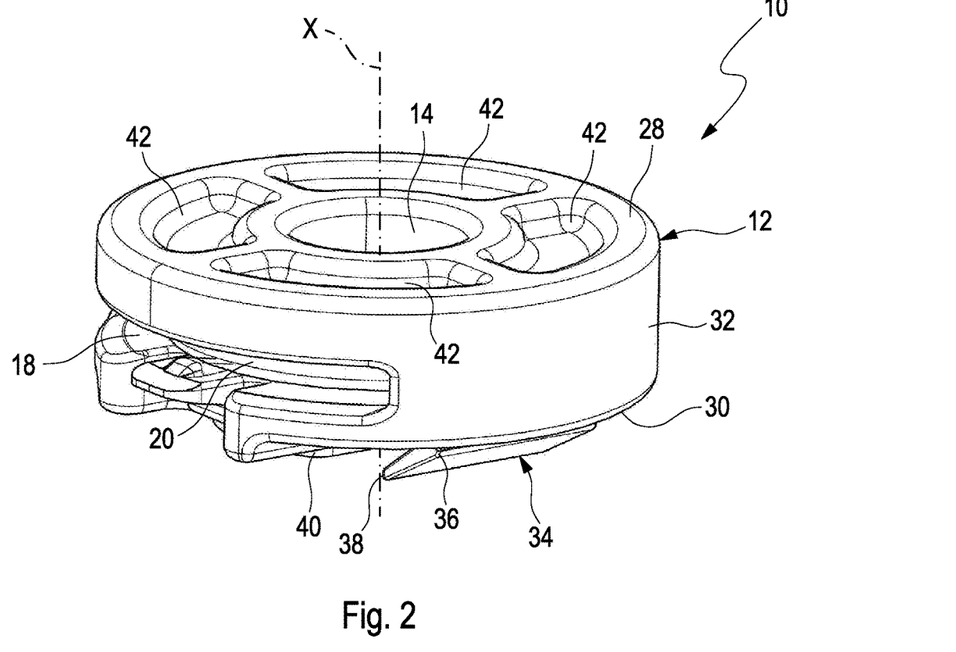
FIG. 2 is a perspective view of the fastening element of FIG. 1.
Figure 3:
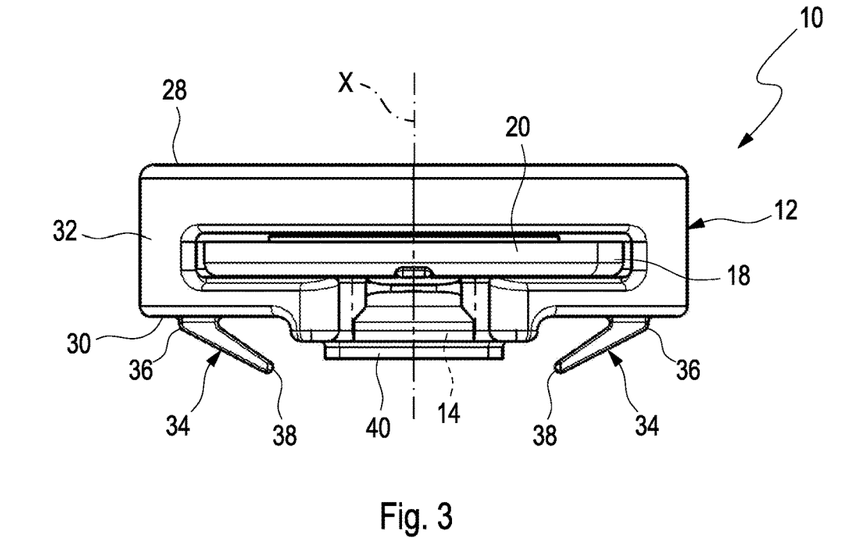
FIG. 3 is a side view of the fastening element of FIG. 1.
Figure 4:
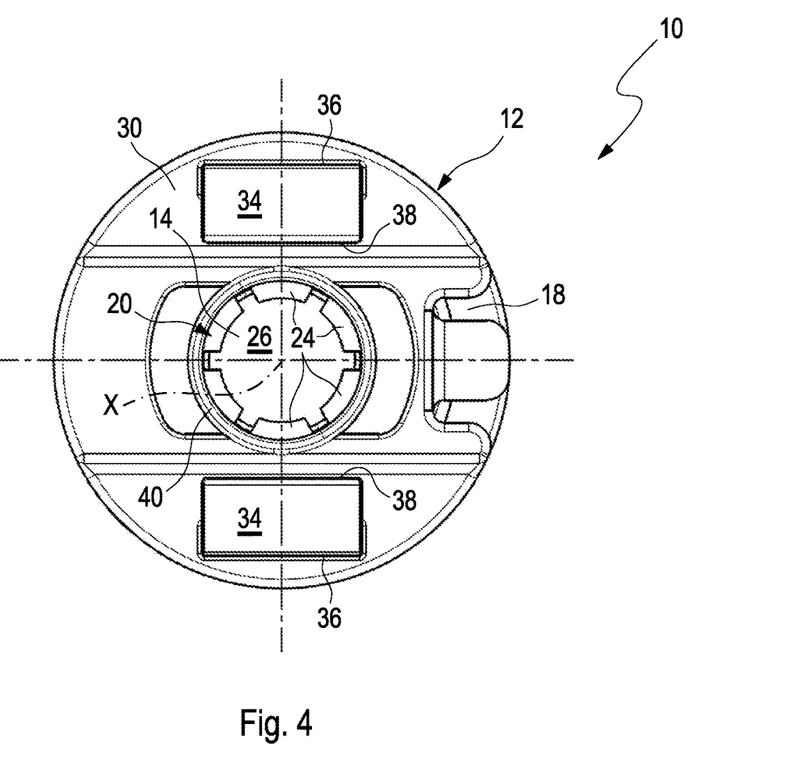
FIG. 4 is a front view of the fastening element of FIG. 1.
Figure 5:
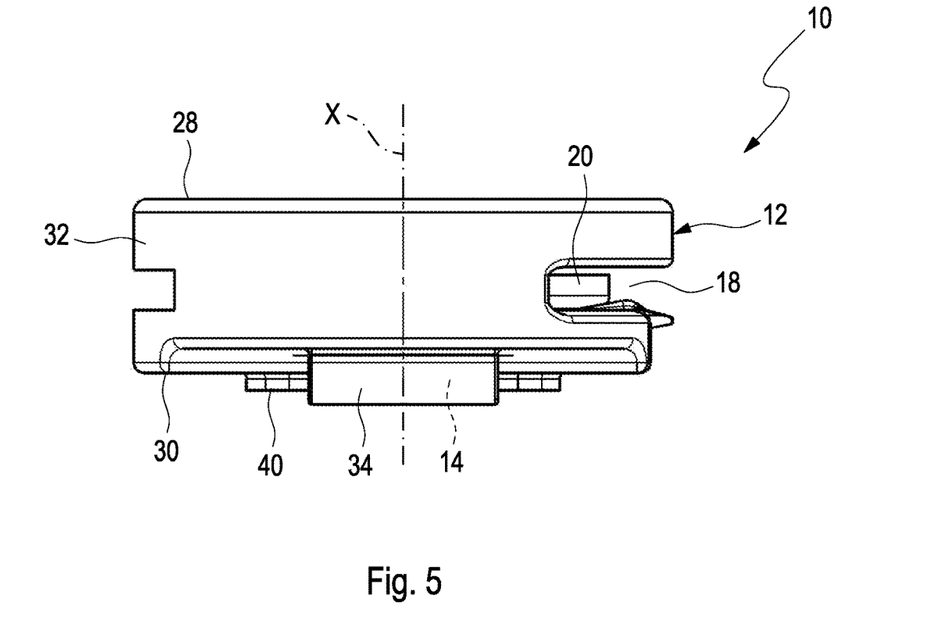
FIG. 5 is a side view of the fastening element of FIG. 1.
Figure 6:
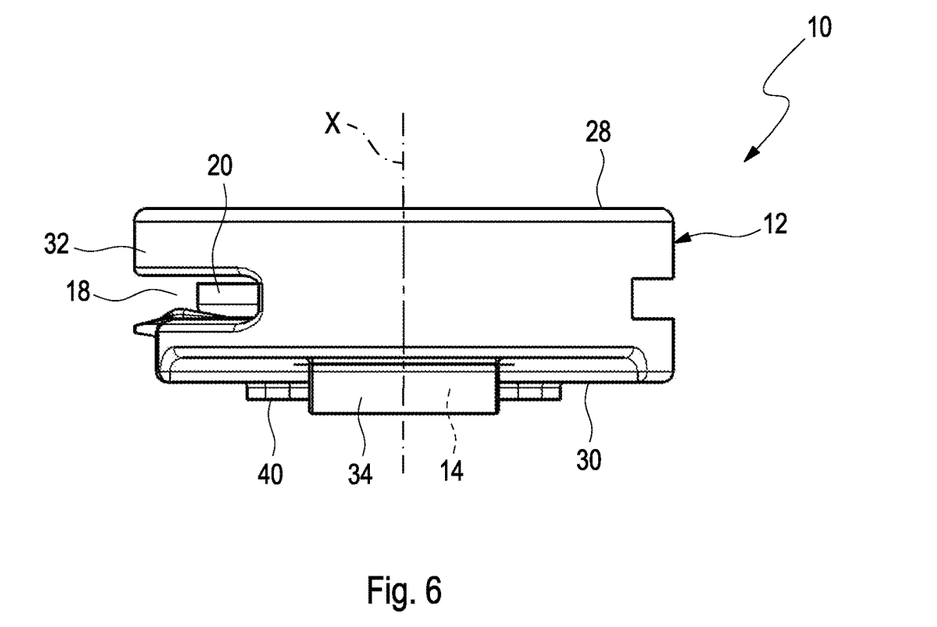
FIG. 6 is another side view of the fastening element of FIG. 1.
Figure 7:
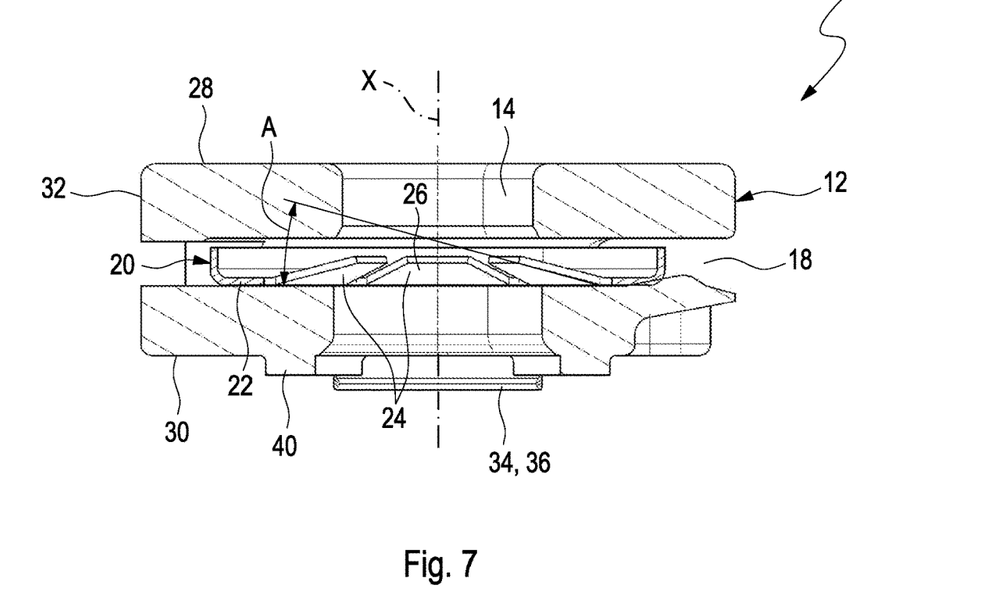
FIG. 7 is a longitudinal sectional view of the fastening element of FIG. 1 with a spring ring.

The recess 14 and the slit 18 are adapted to receive a spring ring 20 (notably visible in FIG. 7). For instance, the spring ring is seated rotatable in the slit, so that a rotational motion of the spring ring 10 within the housing 12 is allowed. The spring ring 10 comprises a body 22 and spring fingers 24. The spring ring is made of metal. The spring ring is seated in the slit with a certain degree of clearance along the longitudinal axis X.

The body is an annular body defining a hole 26. The body extends in a body plane that extends substantially perpendicular to the longitudinal axis X.

The spring fingers 24 protrude into the hole 26. The spring fingers are equally spaced (or evenly distributed) around the longitudinal axis. The spring fingers protrude radially in the hole 15. The spring fingers 24 each extends substantially in a finger plane. The body plane and the finger plane are at an angle between 0 and 90 degrees, in particular between 0 and 45 degrees, or between 0 and 30 degrees, or between 5 and 30 degrees or between 5 and 25 degrees or between 5 and 20 degrees, or at an angle of 15 degrees. The spring fingers are oriented toward the longitudinal axis and toward the top side.

The fastening element 10 is part of the system 44. More particularly, the second component 48 is provided with the fastening element 10. The first component 46 is provided with a stud 16 or a bolt.

The stud 16 is for example a press-in bolt or a welding stud. FIG. 9 illustrates a press-in stud or bolt. The stud 16 comprises a free end with an enlarged section. The free end with the enlarged section is opposite the first component 46. The free end with the enlarged section is followed by a second section having a smaller diameter than the enlarged section, and then a third section having a bigger diameter than the second section and/or than the enlarged section.

Depending the kind of stud used, the stud is either welded or glued or bonded or press-fitted with the first component 46.

The free end of the stud with the enlarged section is received within the recess. Thus the stud cooperates with the spring ring and is retained within the recess by the spring ring, and more particularly by the spring fingers. The enlarged section 52 of the stud forms a supporting surface 54 against which the spring ring rests and prevents an uncoupling of the first and second component. For instance, the enlarged section of the stud forms a supporting surface against which the spring fingers rest.

The first and second component can also be connected together by a spring 56. The spring 56 is arranged at a non-zero distance from the stud and the fastening element 10.

The first component is for example a drive element. The second component is for example a hinged element of a flap, in particular an engine flap, more precisely an engine flap for a vehicle.

In another embodiment, the first component is a hinged element of a flap, in particular an engine flap, more precisely an engine flap for a vehicle, and the second component is a drive element.

Although exemplary embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A fastening element for gripping a shaft of a stud, the fastening element comprising:
   a housing having a top side and a bottom side, and partially defining a recess extending along a longitudinal axis, and adapted to receive the shaft of the stud, and further including a slit extending radially outward from the recess, and a strip having a first and a second end along a strip axis, and the strip first end is connected to the bottom side of the housing, and the second end is a free end, and the strip extends slanting radially inward toward the longitudinal axis and axially downward from the bottom side; and
   a spring ring seated in the slit and partially protruding into the recess, and the sprig ring is seated rotatable in the slit, so that a rotational motion of the spring ring within the housing is allowed, and the spring ring comprises a body and spring fingers, wherein the body is an annular body defining a central hole, and wherein the spring fingers protrude into the hole.

2. A fastening element according to claim 1, wherein the housing is made of plastic material, and wherein the spring ring is made of metal.

3. A fastening element according to claim 1, wherein the spring fingers are evenly distributed around the longitudinal axis.

4. A fastening element according to claim 1, wherein the housing has a circular cross-section and is centered on the longitudinal axis, and the housing has a diameter being between 10 and 30 millimeters.

5. A fastening element according to claim 1, wherein an angle between the strip axis and the longitudinal axis is between 10 and 45 degrees.

6. A fastening element according to claim 1, wherein the bottom side includes a collar that partly extends around the recess.

7. A fastening element according to any claim 1, wherein the top side comprises notches equally distributed around the longitudinal axis.

8. A fastening element according to claim 1, wherein the recess is a blind hole.

9. A fastening element according to claim 1, wherein the recess is a through hole.

10. A system comprising:
    a first component provided with a stud;
    a second component provided with a fastening element comprising:
       a housing having a top side and a bottom side, and partially defining a recess extending along a longitudinal axis and adapted to receive a shaft of the stud, and further including a slit extending radially outward from the recess;
       a spring ring seated in the slit and partially protruding into the recess, and the sprig ring is seated rotatable in the slit, so that a rotational motion of the spring ring within the housing is allowed, and the spring ring comprises a body and spring fingers, wherein the body is an annular body defining a central hole, and wherein the spring fingers protrude into the hole; and
    a spring is provided between the first and the second components, and the spring is distant from the fastening element; and
    wherein the stud is partly received within the recess, and wherein the stud cooperates with the spring ring such that the stud is retained within the recess by the spring ring.

11. A system according to claim 10, wherein the stud further comprises an enlarged section, and wherein the enlarged section of the stud is retained within the recess by the spring fingers.

12. A system according to claim 10, wherein the stud is a welding stud or a press-in bolt.

13. A system according to claim 10, wherein one of the first and second component is a drive element, and wherein the other of the first and second component is a hinged element of an engine flap.

14. A fastening element for gripping a shaft of a stud, the fastening element comprising:
    a housing having a top side and a bottom side, and partially defining a recess extending along a longitudinal axis, and adapted to receive the shaft of the stud, and further including a slit extending radially outward from the recess, and the top side includes notches equally distributed around the longitudinal axis; and
    a spring ring seated in the slit and partially protruding into the recess, and the sprig ring is seated rotatable in the slit, so that a rotational motion of the spring ring within the housing is allowed, and the spring ring comprises a body and spring fingers, wherein the body is an annular body defining a central hole, and wherein the spring fingers protrude into the hole.

15. A fastening element according to claim 14, wherein the spring fingers are evenly distributed around the longitudinal axis.

16. A fastening element according to claim 14, wherein the housing has a circular cross-section and is centered on the longitudinal axis, and the housing has a diameter being between 10 and 30 millimeters.

17. A fastening element according to claim 14, and the housing further includes a strip having a first and a second end along a strip axis, and the strip first end is connected to the bottom side of the housing, and the second end is a free end, and the strip extends slanting radially inward toward the longitudinal axis and axially downward from the bottom side.

18. A fastening element according to claim 14, wherein the bottom side includes a collar that partly extends around the recess.

19. A fastening element according to claim 14, wherein the recess is a through hole.

20. A system comprising:
a first component provided with a stud;
a second component provided with a fastening element comprising:
a housing having a top side and a bottom side, and partially defining a recess extending along a longitudinal axis and adapted to receive a shaft of the stud, and further including a slit extending radially outward from the recess, and a strip having a first and a second end along a strip axis, and the strip first end is connected to the bottom side of the housing, and the second end is a free end, and the strip extends slanting radially inward toward the longitudinal axis and axially downward from the bottom side;
a spring ring seated in the slit and partially protruding into the recess, and the sprig ring is seated rotatable in the slit, so that a rotational motion of the spring ring within the housing is allowed, and the spring ring comprises a body and spring fingers, wherein the body is an annular body defining a central hole, and wherein the spring fingers protrude into the hole; and
wherein the stud is partly received within the recess, and wherein the stud cooperates with the spring ring such that the stud is retained within the recess by the spring ring.

21. A system according to claim 20, wherein the stud further comprises an enlarged section, and wherein the enlarged section of the stud is retained within the recess by the spring fingers.

22. A system according to claim 20, wherein the stud is a welding stud or a press-in bolt.

23. A system according to claim 20, wherein a spring is provided between the first and the second components, and the spring is distant from the fastening element.

24. A system according to claim 20, wherein one of the first and second component is a drive element, and wherein the other of the first and second component is a hinged element of an engine flap.

25. A system comprising:
a first component provided with a stud;
a second component provided with a fastening element comprising:
a housing having a top side and a bottom side, and partially defining a recess extending along a longitudinal axis and adapted to receive a shaft of the stud, and further including a slit extending radially outward from the recess, and the top side includes notches equally distributed around the longitudinal axis;
a spring ring seated in the slit and partially protruding into the recess, and the sprig ring is seated rotatable in the slit, so that a rotational motion of the spring ring within the housing is allowed, and the spring ring comprises a body and spring fingers, wherein the body is an annular body defining a central hole, and wherein the spring fingers protrude into the hole; and
wherein the stud is partly received within the recess, and wherein the stud cooperates with the spring ring such that the stud is retained within the recess by the spring ring.

26. A system according to claim 25, wherein the stud further comprises an enlarged section, and wherein the enlarged section of the stud is retained within the recess by the spring fingers.

27. A system according to claim 25, wherein the stud is a welding stud or a press-in bolt.

28. A system according to claim 25, wherein a spring is provided between the first and the second components, and the spring is distant from the fastening element.

29. A system according to claim 25, wherein one of the first and second component is a drive element, and wherein the other of the first and second component is a hinged element of an engine flap.

* * * * *